(12) United States Patent
Gonzalez Martin et al.

(10) Patent No.: US 12,251,881 B2
(45) Date of Patent: Mar. 18, 2025

(54) SPATIAL ARRANGEMENTS OF OBJECTS FOR ADDITIVE MANUFACTURING

(71) Applicant: Hewlett-Packard Development Company, L.P., Spring, TX (US)

(72) Inventors: Serigo Gonzalez Martin, Sant Cugat del Valles (ES); Manuel Freire Garcia, Sant Cugat del Valles (ES); Ismael Fernandez Aymerich, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 318 days.

(21) Appl. No.: 17/757,788

(22) PCT Filed: Jan. 16, 2020

(86) PCT No.: PCT/US2020/013893
§ 371 (c)(1),
(2) Date: Jun. 21, 2022

(87) PCT Pub. No.: WO2021/145880
PCT Pub. Date: Jul. 22, 2021

(65) Prior Publication Data
US 2023/0027565 A1 Jan. 26, 2023

(51) Int. Cl.
B29C 64/393 (2017.01)
B33Y 10/00 (2015.01)
(Continued)

(52) U.S. Cl.
CPC ............. B29C 64/393 (2017.08); B33Y 10/00 (2014.12); B33Y 30/00 (2014.12); B33Y 50/02 (2014.12)

(58) Field of Classification Search
CPC ... G05B 19/4099; B22F 10/80; B29C 64/386; B29C 64/393; B33Y 30/00; B33Y 50/00; B33Y 50/02
(Continued)

(56) References Cited

U.S. PATENT DOCUMENTS 10,317,882 B2   6/2019   De et al.
2016/0320771 A1   11/2016   Huang
(Continued)

FOREIGN PATENT DOCUMENTS

CN   105818377 A   8/2016
CN   109070467 A   12/2018
(Continued)

Primary Examiner — Ronald D Hartman, Jr.
(74) Attorney, Agent, or Firm — Michael Dryja

(57) ABSTRACT

In an example, a method includes obtaining a compensation model characterising a relationship between a location of an object within a fabrication chamber of an additive manufacturing apparatus and a geometrical compensation to be applied to a model of said object, wherein different geometrical compensation values are associated with different locations. In some examples the method further includes determining a magnitude of a dimension parameter of each object of a set of objects to be generated in a build operation. The method may include determining a spatial arrangement of objects to be generated within the build volume, based on the magnitude of the dimension parameters and the geometrical compensation values for an intended location of object generation in the spatial arrangement.

13 Claims, 6 Drawing Sheets

(51) Int. Cl.
*B33Y 30/00* (2015.01)
*B33Y 50/02* (2015.01)

(58) Field of Classification Search
USPC .......................................................... 700/119
See application file for complete search history.

(56) References Cited

U.S. PATENT DOCUMENTS

| | | |
|---|---|---|
| 2017/0173887 A1 | 6/2017 | Sasaki |
| 2017/0310935 A1* | 10/2017 | Sinclair ................. B29C 64/245 |
| 2017/0368753 A1* | 12/2017 | Yang ....................... G01B 21/20 |
| 2017/0372480 A1* | 12/2017 | Anand ..................... G06F 30/20 |
| 2018/0194630 A1* | 7/2018 | Cai ........................... B01J 13/02 |
| 2018/0329658 A1* | 11/2018 | Collomp ............... B29C 64/386 |
| 2019/0030821 A1 | 1/2019 | Garcia et al. |
| 2019/0134914 A1 | 5/2019 | Gonzalez et al. |
| 2019/0168305 A1 | 6/2019 | Boyle |
| 2020/0223144 A1* | 7/2020 | Sanroma Garrit ...... G06F 30/00 |

FOREIGN PATENT DOCUMENTS

| | | | |
|---|---|---|---|
| CN | 110032343 A | 7/2019 | |
| CN | 110446609 A | 11/2019 | |
| EP | 2433778 A2 | 3/2012 | |
| FR | 2987293 A1 * | 8/2013 | .............. B22F 10/28 |
| WO | 2019/022770 A1 | 1/2019 | |
| WO | 2019/094472 A1 | 5/2019 | |
| WO | 2019/117963 A1 | 6/2019 | |
| WO | 2019/190506 A1 | 10/2019 | |
| WO | 2019/199285 A1 | 10/2019 | |
| WO | WO-2020222784 A1 * | 11/2020 | ........... B29C 64/386 |
| WO | WO-2020222786 A1 * | 11/2020 | ........... B29C 64/386 |

\* cited by examiner

SPATIAL ARRANGEMENTS OF OBJECTS FOR ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
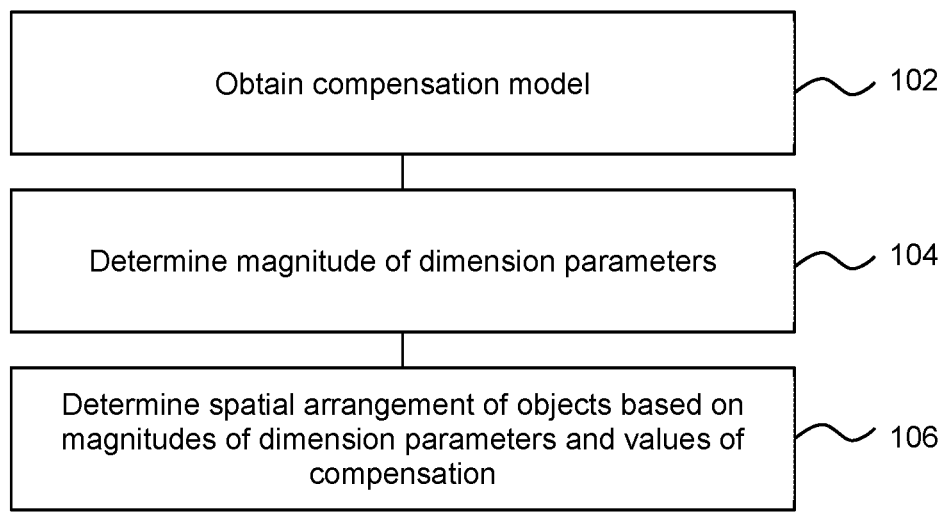
FIG. 1 is a flowchart of an example of a method of determining a spatial arrangement of objects to be generated in additive manufacturing.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be determined from structural design data). The fusing agent may have a composition which absorbs energy such that, when energy (for example, heat) is applied to the layer, the build material to which it has been applied heats up, coalesces and solidifies, upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. Such a fusing agent may comprise any or any combination of an infra-red light absorber, a near infra-red light absorber, a visible light absorber and a UV light absorber. Examples of fusing agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance of an object, and such agents may therefore be termed detailing agents. In some examples, detailing agent may be used near edge surfaces of an object being printed to reduce coalescence. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer designing a three-dimensional model of an object to be generated, for example using a computer aided design (CAD) application. The model may define the solid portions of the object. To generate a three-dimensional object from the model using an additive manufacturing system, the model data may comprise, or can be processed to derive, slices or parallel planes of the model. Each slice may define a portion of a respective layer of build material that is to be solidified or caused to coalesce by the additive manufacturing system.

During manufacturing of an object by additive manufacturing, particularly where heat may be applied to the object, deformations may occur resulting in an object being generated which does not have the expected dimensions. The particular deformations may depend on any or any combination of factors such as the build material used, the type of additive manufacturing, the location of the object within the fabrication chamber of the additive manufacturing apparatus, object volume and the like.

For example, it may be the case that, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the region(s) to which fusing agent is applied. In order to compensate for this effect, i.e.

where it is anticipated that an object may tend to 'grow' during manufacture, the object volume as described in object model data may be reduced.

In other examples, objects may be smaller following object generation than is specified in object model data. For example, some build materials used to generate objects may shrink on cooling. Therefore, an object volume in object model data may be increased to compensate for the anticipated reduction in volume.

In some examples, the particular deformations may depend on the object's location within the fabrication chamber of the additive manufacturing apparatus. This may be because the thermal characteristics vary throughout the fabrication chamber, for example there may be small differences in temperature in different locations. In some examples, objects which are near the bottom of the chamber may be maintained at a higher temperature for a longer period than those located near the top of the fabrication chamber because objects generated near the bottom of the chamber will be generated near the start of the fabrication process, whereas those near the top will be generated later in the process. This may lead to a difference in cooling rates, which may impact deformations. Other differences may exist, for example due to inhomogeneities in heating or cooling, and/or heating or cooling rates, due to the location of heating or cooling elements and/or due to proximity to walls of the fabrication chamber which may affect the cooling rate of build material.

A particular object may be subject to mechanisms which result in growth and/or shrinkage, and the appropriate transformation to apply may be influenced by the different degrees to which an object may be affected by such processes.

Such compensations may be applied using geometrical transformation(s) which may include scaling and/or offsets. For example, a geometrical transformation may comprise at least one scaling factor and/or at least one offset value, and in some examples associate a scaling factor and/or offset value with at least one of three orthogonal axes (e.g. x, y and z, wherein the z-direction is taken herein to be the direction perpendicular to layers of deposited build material and x- and y-directions are in the plane of the deposited layers). A scaling factor may be used to multiply object dimensions in the direction of at least one axis by a value, which may be greater than 1 in order to increase the dimension(s) and less than 1 to reduce the dimension(s), or equal to 1 to have no effect. The scaling factor may be applied to dimensions of an object model, for example being applied to a mesh model of the object.

An offset may specify, for example by a specified distance or a number of defined voxels (i.e. 3D pixels), an amount to add or remove from a surface of the object (or a perimeter within a layer). For example, an offset distance in an axis may be specified and the object may be eroded or may be dilated (i.e., inflated or enlarged) by this distance, for example by moving the vertices of a mesh in the case that the object model is a mesh model, or adding/subtracting a number of voxels in a voxelised model although other methods of providing an offset may be used in other examples.

In summary then, to compensate for anticipated deformations a model describing the object to be generated may be modified before commencing the build process. The modifications may comprise a scaling, whereby the object is 'stretched' or 'compressed' along an axis or axes and/or a surface offset operation which comprises applying either an erosion or dilation operation to a surface of the object. The methods set out below are described with reference to scaling and offsets, although these methods may be combined with any other modification operation(s) to provide a transformed object model.

In some examples the modifications, such as scaling, are applied to the object models when they have been arranged in a spatial arrangement for the fabrication process, for example so that the location of object generation (which as noted above can have an impact on the deformations likely to be seen) can be taken into account. However, if a positive scaling/offset is applied to the objects, then the overall size of the objects is increased and therefore the amount of build material used when generating the objects can be affected (which may in turn reduce the amount of unused build material in a fabrication chamber, which would otherwise be available for recycling). Additional print agent may also be consumed. When the scaling/offset is in the z, or height, dimension, this means that generation of the objects may use more layers of build material than anticipated, which in turn can increase the time used in generating objects.

FIG. 1 is an example of a method, which may comprise a computer implemented method for determining a spatial arrangement of objects to be generated in additive manufacturing.

The method comprises, in block 102 obtaining, by at least one processor, a compensation model characterising a relationship between a location of an object within a fabrication chamber of an additive manufacturing apparatus and a geometrical compensation to be applied to a model of said object, wherein different geometrical compensation values are associated with different locations.

The compensation model may comprise data describing how to compensate for anticipated deformations of an object to be generated, wherein the anticipated dimensions may be affected by its location within the fabrication chamber. For example, it may comprise data representing geometrical transformations, such as offset and/or scaling transformations described above, to be applied to models of objects to be generated within the fabrication chamber as a function of their position within the fabrication chamber. Other factors may also be considered when determining the geometrical compensations to be applied to an object model, in addition to the compensation model, for example based on the material, dimensions (e.g. object volume), type or intended dimensional accuracy of the object to be generated.

In some examples the compensation model may comprise data describing a compensatory geometrical transformation to be applied at a plurality of points or nodes within the fabrication chamber. For example, the fabrication chamber may be divided into a grid, which may be a regularly spaced grid, and each intersection point in the grid is a node which may be associated with at least one geometrical transformation value. For example, a node in the grid may be associated with at least one scaling factor, at least one offset value and/or any other modification value to be applied to objects which are generated at that node (for example, the object may be intended to be generated such that its centre of mass will coincide with the location of the node, or some other definable point of the object is aligned with the location) in the fabrication chamber. Objects to be generated at locations between nodes may for example be assigned the values of the closest node, or the values of the transformations to be applied may be generated by interpolation of the values for surrounding nodes, or the like. In other examples, nodes which intersect with an intended volumetric extent of an object may be averaged.

In some examples the compensation model may be determined for each individual additive manufacturing apparatus or each fabrication chamber. In other examples the compensation model may be determined for a type or class of additive manufacturing apparatus or fabrication chamber. The compensation model may be determined empirically through measurements of objects generated using one or more additive manufacturing apparatus or by use of computer aided modelling of thermal characteristics of the fabrication chamber. In some examples the compensation model may vary over the lifetime of the additive manufacturing apparatus and may be updated throughout the lifetime of the apparatus. For example, generating the model may comprise generating objects and determining if the dimensions of the objects are different from intended dimensions. If that is the case, then the scaling and offsets which, if applied to the object models prior to generation would have resulted in the objects having their intended dimensions may be determined, for example as an average, or using data fitting techniques.

The method comprises, in block 104, determining, using at least one processor, a magnitude of a dimension parameter of each object of a set of objects to be generated in a build operation.

An object, or a plurality of objects, may be generated in a single fabrication process. How such objects are arranged within the fabrication chamber can affect the quantity of build material used in generating the objects, the time taken to generate the objects and the quality of the generated objects. For example, as noted above, if the objects are arranged such that a larger number of layers of build material is used to generate the objects then more build material and more time will be used when generating the objects. Furthermore, if objects are arranged such that adjacent objects interact, then the quality of the generated objects can be affected, for example if adjacent objects are spaced too closely together, the thermal interaction of one object may adversely affect another object causing deformations in said object(s).

The dimension parameter may be a width, length or height of an object. For example, the dimension parameter may be a maximum of the width, length or height of the object, which may be determined while the object is in an arbitrary or a specified orientation. In some example the dimension parameter may be the maximum width, length or height of an object, or in other examples the dimension parameter may be an average (e.g. mean) of at least two of the width, length or height of an object. In some examples, the dimension parameter may be a dimension of a bounding box enclosing the object, where a bounding box may be the minimum cuboid which encloses the object, or may be a larger cuboid which defines a region in which other objects should not be generated (for example to provide an intended minimum spacing and thereby control thermal interaction).

The magnitude of the dimension parameter may for example be predetermined, and/or may be determined from an object model representing the object to be generated, for example a CAD model.

In some examples, prior to determining the magnitude of the dimension parameter, the orientation of the object may be determined. For example, if the dimension parameter is a dimension along the x, y or z-axis of the fabrication chamber, the orientation may affect the determination of the magnitude of the parameter. In some examples the objects may be orientated randomly, whereas in other examples the objects may be preferentially orientated in a particular direction for example to increase packing density of objects, or to reduce the total height of a spatial arrangement of objects. As noted above, while build material may be conserved by having small dimensions within a layer, both time and build material may be saved by having smaller dimensions in the direction perpendicular to the layer. Therefore, in some examples, the object may be oriented with larger dimension(s) in the plane of the layer.

In some examples the orientation of objects may be predetermined. For example, a user may define an orientation in which an object is to be generated, such that the orientation of said object is "anchored". In other examples the orientation may be modified, for example in order to reduce the overall depth of build material used. As noted above, in some examples, a model of an object to be generated may describe a bounding box. In such examples, the orientation of the object may be varied such that the minimum dimension of the bounding box (i.e. the smallest of the height, width and depth of the bounding box) is aligned with the z-axis, to reduce the depth of build material used in generating the object (and therefore the time taken for object generation in some examples). In some such examples, once the alignment of an object along the z-axis has been determined, it may remain constant through the following methods.

The method comprises, in block 106, determining, using at least one processor, a spatial arrangement of objects to be generated within the build volume, based (at least in part) on the magnitude of the dimension parameter and the value of the compensation parameter for the intended location of object generation in the spatial arrangement.

Generally, according to the method of FIG. 1, the spatial arrangement may be such that modifications which tend to increase object dimensions are minimised. In particular, objects may be placed where the value of at least one compensation parameter for the intended location of object generation is low (i.e. increases the size of the object by a relatively small amount, or decreases the size of an object). However, in particular when scaling factors are considered, the amount by which the object grows will depend on its underlying dimensions—larger objects will grow in proportion to their size. In some examples herein, the spatial arrangement may in particular be determined such that objects which have a relatively large height in the z-axis during object generation are placed, or tend to be placed in location(s) with relatively low positive scaling factors (i.e. factors close to 1), or with negative scaling factors (i.e. factors of less than 1), and vice versa, such that there is a generally negative correlation or trend between scaling factor in z and object dimension in z. In some examples, there may be a bias in the generation of a spatial arrangement such that this relationship results. However, there may be additional factors which are also taken into account, such as overall packing efficiency and the like, which may mean that the objects are not placed strictly with dimension order being inversely related to the compensation value.

In some examples, the locations of objects may be selected such that locating an object in a particular location does not significantly increase the number of layers deposited during a fabrication process due to the compensation applied to the object model as specified for the compensation parameter at that location. This may be balanced across a set of objects to be generated in a single build operation. Thus, while the arrangement may not be optimised for each individual object, taken as a whole, the arrangement may tend to be lower in height than a random arrangement. In some examples, a number of spatial arrangements may be evaluated and a spatial arrangement with a lower height may be selected over at least one spatial arrangement with greater height.

Figure 2A:
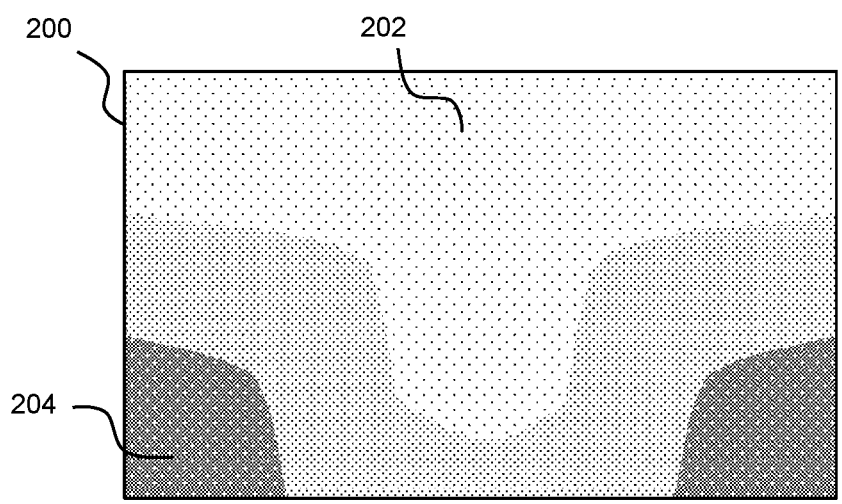
FIG. 2A is a simplified schematic drawing of an example build volume of a fabrication chamber.

FIG. 2A shows an example of a cross section of build volume 200 of a fabrication chamber of an additive manufacturing apparatus. The horizontal direction in this figure corresponds to the x-direction and the vertical direction corresponds to the z-direction. The y-direction is perpendicular to the plane of the Figure. In other words, the Figure shows a 'side view' of the fabrication chamber. As described above the build material may be deposited in horizontal layers i.e. in the x-y plane, onto which fusing agent may be selectively distributed onto portions of a layer to cause those portions to solidify to form a slice of an object to be generated.

The shading in the build volume 200 illustrates the values of compensation parameters compensation model. Regions of the build volume which are colored light 202 are regions which have a low geometrical compensation value(s) and regions of the build volume which are colored dark 204 are regions in which have a high geometrical compensation value(s), which may for example be a scaling factor in the z axis. As can be seen, in this example, regions towards the bottom and near the corners of the build volume 200 have higher geometrical compensation values than those near the centre and top of the build volume 200.

Figure 2B:
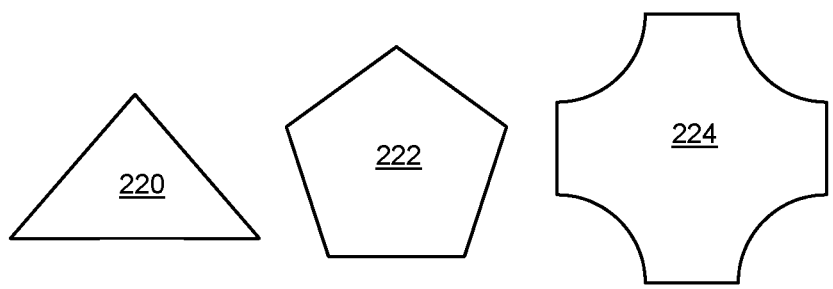
FIG. 2B is a simplified schematic drawing of example objects to be generated in additive manufacturing.

FIG. 2B shows an example of objects to be generated in additive manufacturing. This figure shows cross sections of the objects in the x-z plane (i.e. the same plane as the cross section depicted in FIG. 2A). In this example there are three objects: a first object 220 with a triangular cross section, a second object 222 with a pentagonal cross section and a third object 224 with a cross shaped cross section. A dimensional parameter of these objects is their height, i.e. the difference between the maximum coordinate in the z-direction and the minimum coordinate in the z-direction. As can be seen the first object 220 has the smallest height and the third object 224 has the greatest height.

Figure 2C:
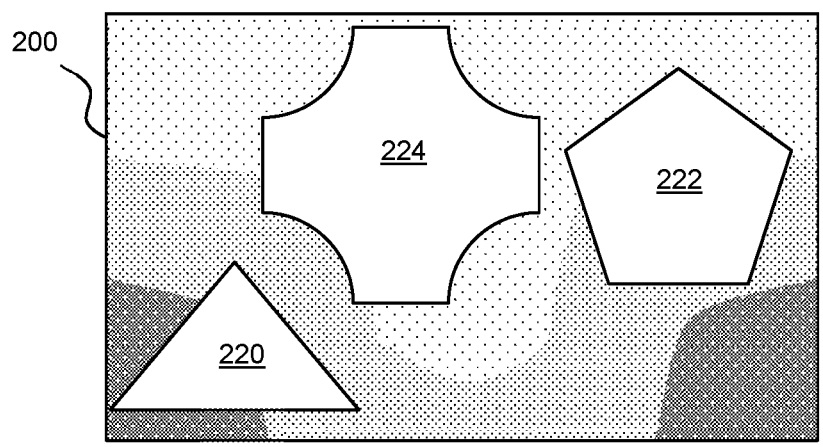
FIG. 2C is a simplified schematic drawing of an example of a spatial arrangement of objects to be generated in a build volume.

FIG. 2C shows a spatial arrangement of the objects 220, 222, 224 within the build volume 200. The objects have been arranged based (at least in part) on their dimensional parameter and on the compensation model. In this example the dimensional parameter is the height of the objects and the objects are arranged such that the object with the greatest height (the third object 224) is located in a position with low geometrical compensation 202 and the object with the smallest height (the first object 220) is located in a position with higher geometrical compensation 204.

In examples where the geometrical compensation is a positive scaling operation applied in the z-direction, arranging objects in this manner, with 'taller' objects (i.e. height in the orientation of object generation) in regions of relatively low geometrical scaling will reduce the number of layers of build material used in generating the objects relative to spatial arrangements which do not consider the compensation model when placing objects. This is because when a tall object is located in a region of higher scaling its dimension will be increased more than a smaller object located in the same region. For example, consider a region where a +10% positive scaling (e.g. a scaling factor value of 1.1) is applied and an object which has a height of 10 cm. This object would be scaled such that it has a height of 11 cm during fabrication (with the expectation that the object would shrink, for example on cooling, to 10 cm). In contrast an object which has a height of 1 cm would be scaled to 1.1 cm when located in the same region. Therefore if these two objects were to be generated, locating the 10 cm object in this region would result in an increase of 1 cm in the depth of build material used whereas if the 1 cm object were located in this region it would result in a 0.1 cm increase in the depth of build material used. Therefore, by considering the geometrical compensation and the dimensions of the objects to be generated, the overall height of a spatial arrangement may be reduced relative to a spatial arrangement in which the geometrical compensation and dimensions were not considered.

In an example an object is to be generated with a height of 380 mm. When such an object is located in a region with a 5% z-scaling (a scaling factor value of 1.05), the object will be generated with a height of 399 mm. In an example additive manufacturing apparatus with a layer thickness of 80 microns, such an object would comprise 4988 layers. In contrast if the same object were located in a region with a z-scaling of 2.5% (a scaling factor value of 1.025) the object would be generated with a height of 389.5 mm, which in the same additive manufacturing apparatus would comprise 4869 layers. Therefore, by locating the object in the region with lower z-scaling the number of layers used in generating the object can be reduced by 119 layers compared to the alternative example.

Figure 3:
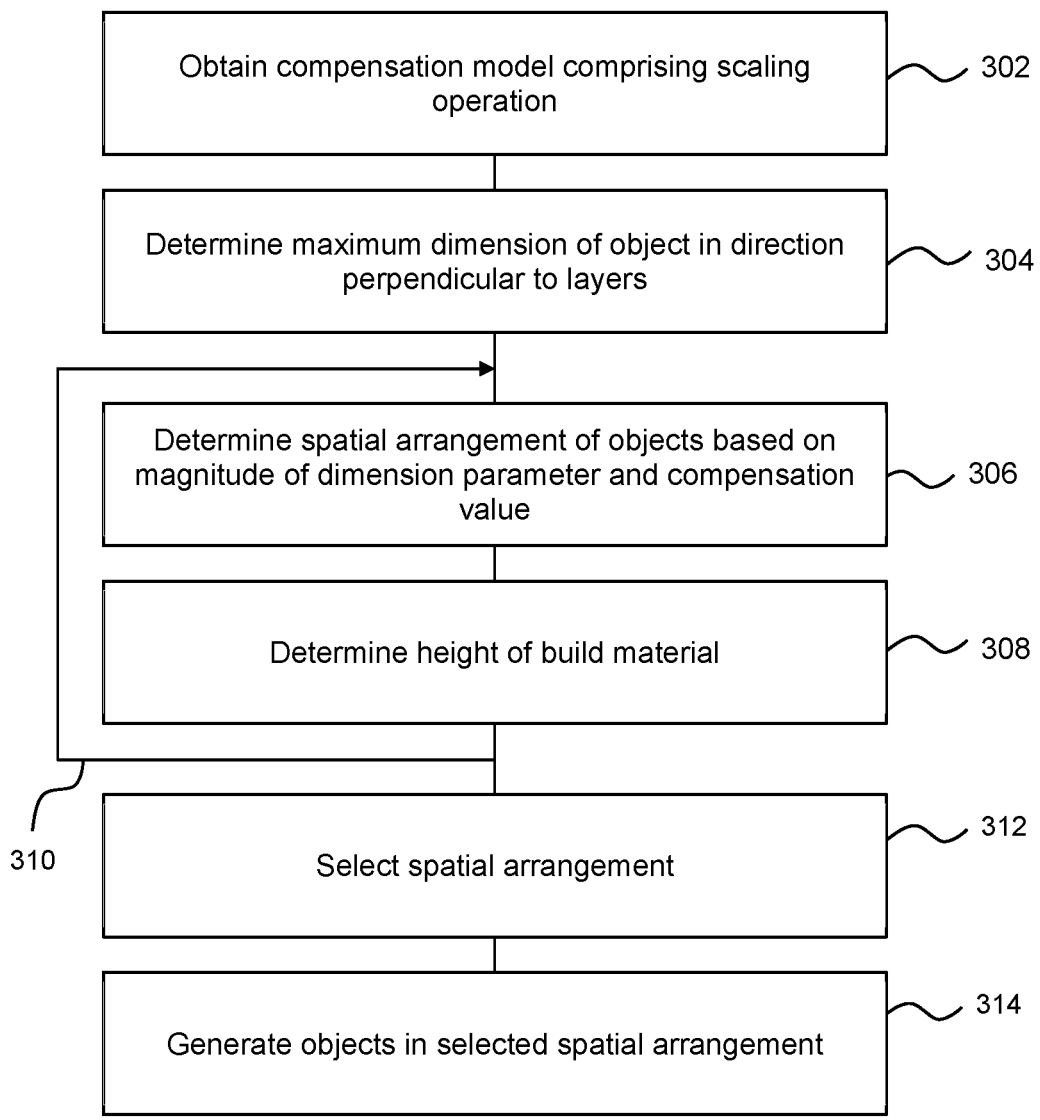
FIG. 3 is a flowchart of an example of a method of determining a spatial arrangement of objects in additive manufacturing and generating the objects.

FIG. 3 is an example of a method, which may comprise a computer implemented method for selecting and determining a spatial arrangement for objects in additive manufacturing and generating the objects.

Block 302 comprises obtaining, at least one processor, a compensation model wherein the geometrical compensation to be applied comprises a scaling operation. The scaling operation may be defined as a single numerical value associated with each of a plurality of points (or nodes) within the fabrication chamber, for example a point may be associated with a scaling of 1.01, 1.02 or 1.05, which will result in the object model being enlarged in each direction by +1%, +2% or +5% if the object is to be generated at that point (where different points may be associated with different scale factor values). In other examples different scaling factors may be applied in different directions. For example each point may be associated with an x-scaling factor value to describe scaling to be applied in the x-direction, a y-scaling factor value to describe scaling to be applied in the y-direction and a z-scaling factor value to describe scaling to be applied in the z-direction. Such a scaling factor may be written as $(s_x, s_y, s_z)$, wherein $s_x$ is the scaling applied in the x-direction at that point, $s_y$ is the scaling applied in the y-direction at that point and $s_z$ is the scaling applied in the z-direction at that point. For example, in this notation, (1.01, 1.02, 1.03) represents a scaling of +1% in the x-direction, a scaling of +2% in the y-direction and a scaling of +3% in the z-direction.

For example, if an object is to be generated at a first location within the fabrication chamber, the location may be mapped to a geometrical transformation comprising one or more offset and/or scaling values which are intended to compensate for anticipated deviations from intended dimensions. However, if the same object were to be generated at a second location within the fabrication chamber, this second location may be mapped to a different geometrical transformation comprising one or more different offset and/ or scaling values. Thus, the particular geometrical transformation applied may vary between different locations, and may be based on predetermined mappings or the like.

In other examples the compensation model may comprise at least one addition and/or different type of geometrical transformation, for example it may comprise offsets, shear operations or twisting operations to be applied to objects to be generated as a function of their location within the fabrication chamber.

The geometrical transformation parameter value(s) and/or geometrical compensation model(s) specifying such parameters may for example be stored in a memory, for example embodied as a mapping resource(s) such as lookup tables and the like, or may be embodied as one or more algorithm, for example relating object generation location (and in some examples other factors such as any or any combination of volume, surface area, packing density, environmental conditions, object generation apparatus, object generation material composition, object cooling profile or print mode or the like) to a compensation to be applied to object model data.

In some examples the geometrical compensation is a scaling operation and the scaling operation is to modify the geometry of the model of the object in a direction perpendicular to layers of build material deposited during the build operation. For example, the scaling operation may be a scaling operation as described in relation to FIG. 2C, wherein the scaling is a scaling in the z-direction. Scaling in the z-direction may be considered as this will have an impact on the height of objects to be generated and therefore will impact the number of layers which are used when generating the objects.

In other examples the scaling operation may be parallel to the layers, for example in x-direction or the y-direction. In such examples considering scaling operations which are in the plane of the layers may result in less build material being solidified, and therefore more build material being available for recycling in a subsequent build operation. Alternatively, or additionally, in some examples, this may allow higher density packing of objects to be generated within the horizontal direction, for example by locating objects with large horizontal dimensions in positions with low horizontal scaling factors.

Block 304 comprises determining, at at least one processor, a magnitude of a dimension parameter, wherein the dimension parameter is a maximum dimension of the object in a direction perpendicular to layers of build material deposited during the build operation. In other words, the dimension parameter may be the maximum height of the object in the intended object generation orientation. For example, in the example of the first object 220 of FIG. 2B, the height is the distance measured vertically from the base of the triangle to the point at the top of the triangle.

The dimension parameter may vary with the orientation of an object. For example, the height of the first object 220 in the orientation when in FIG. 2B is smaller than the height would be if the object was rotated 90° such that the base of the triangle was orientated vertically. In some examples the orientation of the objects to be generated is determined prior to determining the spatial arrangement. For example, some additive manufacturing apparatus have a higher resolution in one axis than another axis. For example, the achievable resolution in the z-axis is set by the thickness of the layers to be deposited, whereas the resolution parallel to the layers may be greater as it is not constrained by the thickness of the layers. Therefore, in some examples, objects may be oriented such that the dimensions with lower tolerances (i.e. dimensions which are intended to be precise) are in directions where the apparatus operates at a higher resolution. Therefore, the orientation may be predetermined based on such considerations.

In some examples the objects to be generated may be orientated in any orientation. In such examples the objects may be rotated such that their smaller dimensions are perpendicular within the fabrication chamber to maintain a lower number of layers. In these examples the dimension parameter may the dimension which is orientated in the z-direction after such a rotation is performed.

In some examples, it may be intended to generate a plurality of objects, some of which may be "anchored" in a predetermined orientation as described, while other (or in some cases, all) objects may be generated in any orientation. In such examples the anchored objects may be translated, but not rotated when determining the spatial arrangement, whereas the other objects may be rotated and/or translated.

Block 306 comprises, at at least one processor, determining a spatial arrangement of objects to be generated within the build volume, based (at least in part) on the magnitude of the dimension parameter and the value of the compensation parameter for the intended location of object generation in the spatial arrangement, and corresponds to block 106 of FIG. 1. The spatial arrangement may be generated to, for example, respect a minimum spacing between the objects. For example, the arrangement may be generated by assigning objects in order of height, such that the tallest object is assigned to the location with the lowest scaling factor, then the next tallest object is assigned to the location of the remaining available locations with the lowest scaling factor. In other examples, zones may be defined based on a range of scaling factor value, and, starting with the tallest objects may be assigned to locations in the zone associated with the lowest range of scaling factors values, and once this zone is full of the taller objects, the next zone may be populated with objects. This may allow for some freedom in placement of the objects (which may result in an overall improved solution, for example allowing better packing of objects). In other examples, objects may be placed using a weighting which penalises the placement of tall objects in locations associated with high scaling factors. This may be evaluated using a cost function or the like. In some examples the spatial arrangement of objects may be obtained by applying a block, or blocks, of the method shown in FIG. 4.

Block 308 comprises, at at least one processor, determining a height of build material that would be used in generating the objects to be generated in that spatial arrangement. The height of build material will be related to the total height of the spatial arrangement of objects to be generated, and may include any scaling, offsets, or other geometrical compensations which are to be applied to the object models representing the objects to be generated. Additionally, the height of build material may include additional layers, for example above or below the objects to be generated. When a greater height of build material is used, the cost of generating the objects increased due to the additional material used. Furthermore, the time taken to generate the objects is increased. In some additive manufacturing apparatus, the time taken to generate the objects is substantially proportional to the number of layers deposited when building the objects. Each layer may have a constant nominal thickness, so the number of layers is directly proportional to the height of build material, and so a greater height of build material results in a larger number of layers and a longer time taken to generate the objects. The height of build material also may affect the time taken for the objects to cool. A greater height of build material may store more thermal energy and so may take longer to cool than a relatively smaller height of build material, again adding to the time taken in generating the objects. Therefore, the determined height of build material may be considered when determining or selecting a spatial arrangement to be used in generating objects.

In some examples, the determined height of build material may be used in determining a 'score' for the arrangement, which may take into account factors such as how many objects (for example, compared to a target number of objects) are contained within the arrangement).

For example, a candidate virtual build volume may be assessed using an equation as set out below:

candidate_virtual_build_volume_nesting_score =

$$e^{\rho} * \left( \alpha * \frac{\sum_{i=0}^{n} Z_i}{n} + \beta * \frac{\max(Z)}{\vartheta} \right)$$

Where:
ρ=Number of objects which are omitted from candidate virtual build volume compared to target
Z =height of each object in the build volume, measured from the bottom of the build volume
ϑ=Usable height of build volume
α=Assigned importance of the average height
β=Assigned importance of the maximum height
n=number of objects
In this equation, max(Z) is the determined height.

After block 308 the method returns to block 306, as represented by the arrow 310, in order to determine a plurality of spatial arrangements of objects to be generated within the build volume, each spatial arrangement based (at least in part) on the magnitude of the dimension parameter and the value of the compensation parameter for the intended location of object generation in that spatial arrangement. Each spatial arrangement is determined in a similar manner to the first spatial arrangement, for example varying the initial placement within rules which favour placing taller objects in location(s) with lower scaling factors. In some examples, the spatial arrangements may be based on the first spatial arrangement, for example comprising a 'random' shuffling including translations and/or rotations of the objects. The movements may in some cases be such that the iterative change may generally preserve, at least in part, the initial tendency for tall objects to be in location(s) associated with low scaling factors. Thus, the initial arrangement, which was derived (at least in part) on the basis of placing large objects where they may grow by a relatively small amount, may provide a promising starting point for such an iterative process. The plurality of spatial arrangements may be a plurality of candidate spatial arrangements from which one spatial arrangement is selected for use in generating the objects. The method may complete the loop represented by the arrow 310 a number of times before proceeding to block 312. The number of times the loop is performed may be predetermined, for example the blocks 306, 308 may be repeated until a predetermined number of spatial arrangements is obtained. In other examples the method may run for a predetermined length of time before continuing to block 312. In other examples a user may control the length of time or number of spatial arrangements which are obtained. In other examples the spatial arrangements may be evaluated, and the method may continue to block 312 when a spatial arrangement is generated which meets a criteria, for example a height of build material below a threshold, or a score, or when a target cost from a cost function is achieved for the arrangement. In some examples determining the height of each spatial arrangement may be performed when each spatial arrangement is determined, whereas in other examples the height of each spatial arrangement may be determined after the plurality of spatial arrangements are determined.

When a plurality of spatial arrangements has been generated, the method continues to block 312, which comprises, at at least one processor, selecting a spatial arrangement for use in generating the objects based on the determined height. Selecting the spatial arrangement of objects may be performed by comparing the spatial arrangements or by scoring the spatial arrangements according to some criteria, for example as set out above. Such criteria may comprise any or any combination of the height of build material used in generating the objects in that spatial arrangement, the quantity or quality of objects generated by that spatial arrangement, density of solidified build material relative to unsolidified build material for that spatial arrangement, and whether all the objects to be generated can fit in the fabrication chamber, and if they cannot fit how many objects are unable to fit in the fabrication chamber.

Block 314 comprises generating the objects in the selected spatial arrangement. In order to generate objects in the selected spatial arrangement objects generation instructions may be generated for use in an additive manufacturing apparatus. The additive manufacturing apparatus may then execute said instructions in order to generate the objects in the selected spatial arrangement.

In some examples generating the objects in the selected spatial arrangement, may comprise forming a layer of build material, applying print agent(s), for example through use of 'inkjet' liquid distribution technologies in locations specified in object model data for an object model slice corresponding to that layer using at least one print agent applicator, and applying energy, for example heat, to the layer. Some techniques allow for accurate placement of print agent on a build material, for example by using printheads operated according to inkjet principles of two-dimensional printing to apply print agents, which in some examples may be controlled to apply print agents with a resolution of around 600 dpi, or 1200 dpi. A further layer of build material may then be formed, and the process repeated, for example with the object model data for the next slice.

Figure 4:
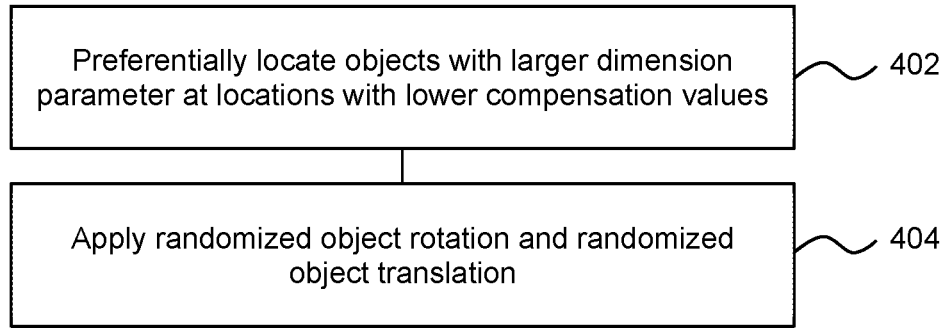
FIG. 4 is a flowchart of an example of a method of determining a spatial arrangement of objects.

FIG. 4 is an example of a method of determining a spatial arrangement of objects and may be an example of the method of block 306 of FIG. 3.

Block 402 comprises, at at least one processor, preferentially locating objects with a larger dimension parameter at locations with lower values of compensation a parameter such as a lower scaling factor. The objects may for example be considered in order in terms of their largest dimension (referred to as 'maximal dimension' herein), with objects being placed in order from the largest maximal dimension to the smallest and being assigned positions starting with a location/zone associated with the smallest object growth as specified by at least one geometrical compensation value (e.g. the smallest scaling factor in at least one dimension) to the largest object growth. In some examples the objects of larger dimension parameters may be located preferentially at locations with lower values of compensation parameter by considering a cost function which takes account of the dimensions of objects, their location and compensation parameters. In other example, the solution may be arrived at iteratively. For example, an initial, or "seed", arrangement of objects may be obtained, for example by randomly positioning objects within a virtual fabrication chamber, and iteratively changing positions of objects to find a reduced cost function value. Iterative procedures such as metaheuristics, GRASP (Greedy Randomized Adaptive Search Procedure), Ants Colony Algorithm or genetic procedures may be used.

In some examples the compensation parameter is a scaling, as described above. Scaling factors can either increase or decrease a dimension of an object. When a scaling factor greater than 1 is applied to an object model the object generated from that model is relatively larger, whereas when a scaling factor of less than 1 is applied to an object model the object generated from that object model is relatively smaller. A lower value of compensation parameter (or a lower geometrical compensation value) may refer to a parameter which increases the size of an object by a relatively smaller amount or decreases the size of an object by a greater amount. For example, a scaling factor of 1.10 is considered to be lower than a scaling factor of 1.15, and a scaling factor of 0.95 is considered to be lower than a scaling factor of 1.05. The absolute change in the dimensions of an object with a larger dimension are larger than the changes in a relatively smaller object, as described previously. Therefore, by locating objects with larger dimension parameters at locations with lower values of compensation parameter the change in their dimension is reduced. This may result in a spatial arrangement with an overall smaller dimension in the z-direction relative to a spatial arrangement in which the values of compensation parameters are not considered.

Block 404 comprises, at at least one processor, applying at least one of a randomized object rotation and a randomized object translation to a first spatial arrangement to determine a second spatial arrangement. When generating each spatial arrangement there may be a randomized aspect to the positioning of objects within that arrangement. In some examples a large number of spatial arrangements may be generated and a spatial arrangement selected form the large number of spatial arrangement, so by applying a randomized object rotation and/or a randomized object translation to obtain each arrangement, each of the generated spatial arrangements can be substantially different from each other. Although the object rotations and translations are randomized, there may be some weighting based on a magnitude of a dimension parameter and value of a compensation parameter, for example to increase the probability of applying a translation and/or rotation that would result in a relatively large (or tall) object being located at a position with a relatively small compensation parameter (such as a z-scaling factor). For example, the weighting may be based on the increase or decrease in the number of layers used in building a spatial arrangement when an object is translated and/or rotated. Such a weighting may be a function of scaling factor, object dimension and surface offset and any other dimensional modification to be applied. The change in number of layers may be determined by dividing the change in dimensions in the z-direction by the layer height (for example 80 μm).

In some examples, each subsequent spatial arrangement may be obtained from a previously generated spatial arrangement. Such a method may be referred to as a 'shuffling' method, wherein a subsequent spatial arrangement is obtained from the previous arrangement by applying randomized translations and/or rotations to the object models of the preceding spatial arrangement.

The 'shuffling' may therefore be relatively constrained such that a subsequent arrangement may contain features of a previous arrangement, such as a tendency for taller objects to be placed in location(s) with relatively low scaling factors.

Figure 5:
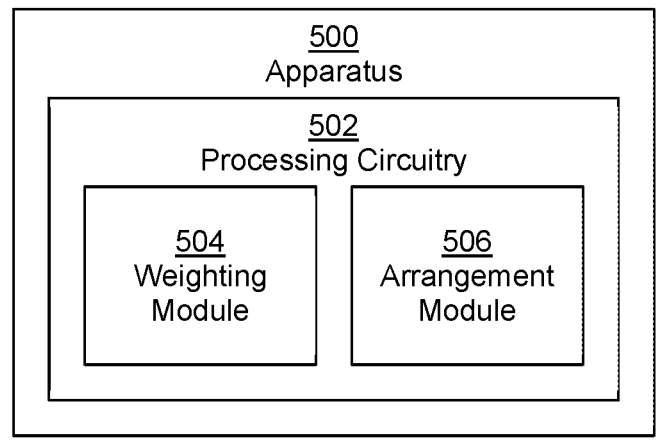
FIG. 5 is a simplified schematic drawing of an example apparatus.

FIG. 5 shows an example of apparatus 500 comprising processing circuitry 502. The processing circuitry 502 comprises a weighting module 504 and an arrangement module 506.

In use of the apparatus 500, the arrangement module 506 obtains a geometrical compensation profile for a build chamber of an additive manufacturing apparatus in which the objects are to be generated, wherein the geometrical compensation profile specifies different geometrical compensations for different intended object generation locations within the build chamber. The geometrical compensation profile may be a geometrical compensation model as described previously, for example it may describe the scaling to be applied to objects as a function of their position within the fabrication chamber.

In use of the apparatus 500, the weighting module 504 determines, for each of a plurality of objects to be generated by an additive manufacturing apparatus, a weighting based on a dimension of the object. For example, smaller objects may have a lower weighting that larger objects The arrangement module 506 determines an arrangement of objects within the build chamber by preferentially locating objects with a weighting (as determined by the weighting module 504) corresponding to larger dimensions in positions with a smaller geometrical compensation according to the geometrical compensation profile. For example, as discussed above, the objects may be identified by their weighting in order of size, and placed accordingly with larger objects being assigned to locations/zones associated with lower scaling factors. In another example, each object placement may result in a component of a cost function which may combine the weight associated with the object with a value of a geometrical transformation. In a simple example, larger objects have a higher weighting. The object weighting may be multiplied by a scaling factor for a given location, and the result summed over the set of objects to provide a value of a cost function. A smaller cost function is indicative that the larger objects are placed in locations associated with a lower scaling factor. By locating objects larger dimensions in positions where smaller geometrical compensations are applied, the magnitude of the compensations which are applied to the objects may be reduced.

Figure 6:
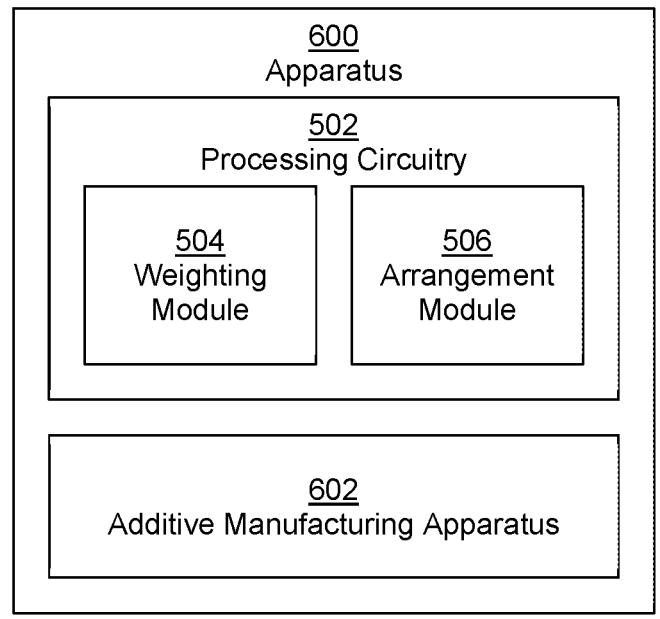
FIG. 6 is a simplified schematic drawing of an example apparatus for additive manufacturing.

FIG. 6 shows an example of apparatus 600, which comprises the processing circuitry 502 of FIG. 5. The apparatus 600 further comprises an additive manufacturing apparatus 602 to generate objects according to the selected spatial arrangement.

The additive manufacturing apparatus 602 may further comprise a print instruction module, which in use of the additive manufacturing apparatus determines print instructions for generating the objects having the selected spatial arrangement.

The print instructions (or object generation instructions) may, in use thereof, control the additive manufacturing apparatus 602 to generate each of a plurality of layers of the object. This may for example comprise specifying area coverage(s) for print agents such as fusing agents, colorants, detailing agents and the like. In some examples, object generation parameters are associated with object model sub-volumes (voxels or pixels). In some examples, the print instructions comprise a print agent amount associated with sub-volumes. In some examples, other parameters, such as any, or any combination of heating temperatures, build material choices, an intent of the print mode, and the like, may be specified. In some examples, halftoning may be applied to determine where to place fusing agent or the like.

The additive manufacturing apparatus 602 may, in use thereof, generate an object in a plurality of layers (which may correspond to respective slices of an object model) according to the print instructions. For example, this may comprise generating at least one object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The additive manufacturing apparatus 602 may comprise additional components not shown herein, for example any or any combination of a fabrication chamber, a print bed, printhead(s) for distributing print agents, a build material distribution system for providing layers of build material, energy sources such as heat lamps and the like.

Figure 7:
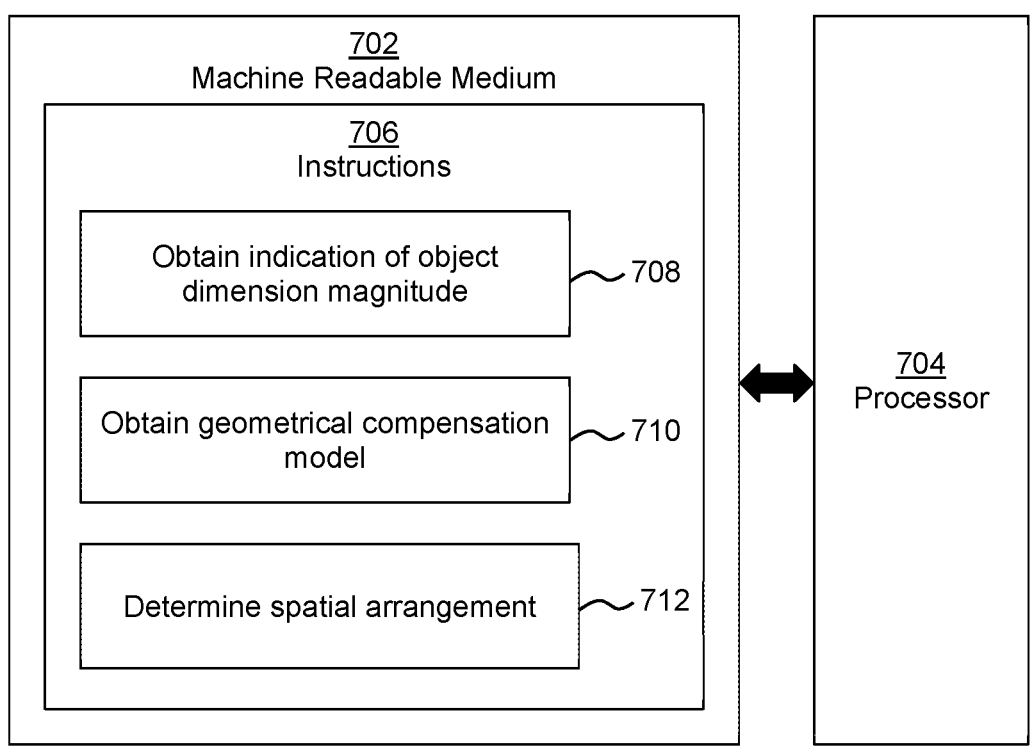
FIGS. 7 and 8 are simplified schematic drawings of an example machine readable medium associated with a processor.

FIG. 7 shows a machine readable medium 702 associated with a processor 704. The machine readable medium 702 comprises instructions which, when executed by the processor 704, cause the processor 704 to carry out tasks.

In this example, the instructions 706 comprise instructions 708 to cause the processor 704 to obtain, for a plurality of objects, an indication of an object dimension magnitude. The plurality of objects may be objects to be generated in additive manufacturing and the object dimension may be a measurement indicating the size of the object, for example the width, depth or height of each object or a bounding box of an object. Such dimensions may be obtained from a model representing the objects, such as a CAD model.

The instructions 706 further comprise instructions 710 to obtain a geometrical compensation model of a build chamber of an additive manufacturing apparatus, wherein the geometrical compensation model specifies geometrical compensations to compensate for anticipated deformation during object generation, and the geometrical compensation model specifies geometrical compensations of different magnitudes for different locations within the build chamber. The anticipated deformation may be due to changes in dimensions in the build material and generated objects throughout the build process, for example due to changes and differences in temperature. For example, thermal gradients within a fabrication chamber can cause different parts of an object to solidify at different rates causing deformations of the object. The geometrical compensations may account for such deformations such that the generated objects, when completed and cooled after generation are dimensionally accurate.

The instructions 706 further comprise instructions 712 to determine a spatial arrangement of objects to be generated in the additive manufacturing apparatus to provide a negative correlation between object dimension magnitude and geometrical compensation magnitude. In other words, the objects are arranged such that, at least to some extent, objects with a larger object dimension magnitude are located in regions with a smaller geometrical compensation magnitude and arranged such that objects with a smaller object dimension magnitude are located in regions with a larger geometrical compensation magnitude.

Figure 8:
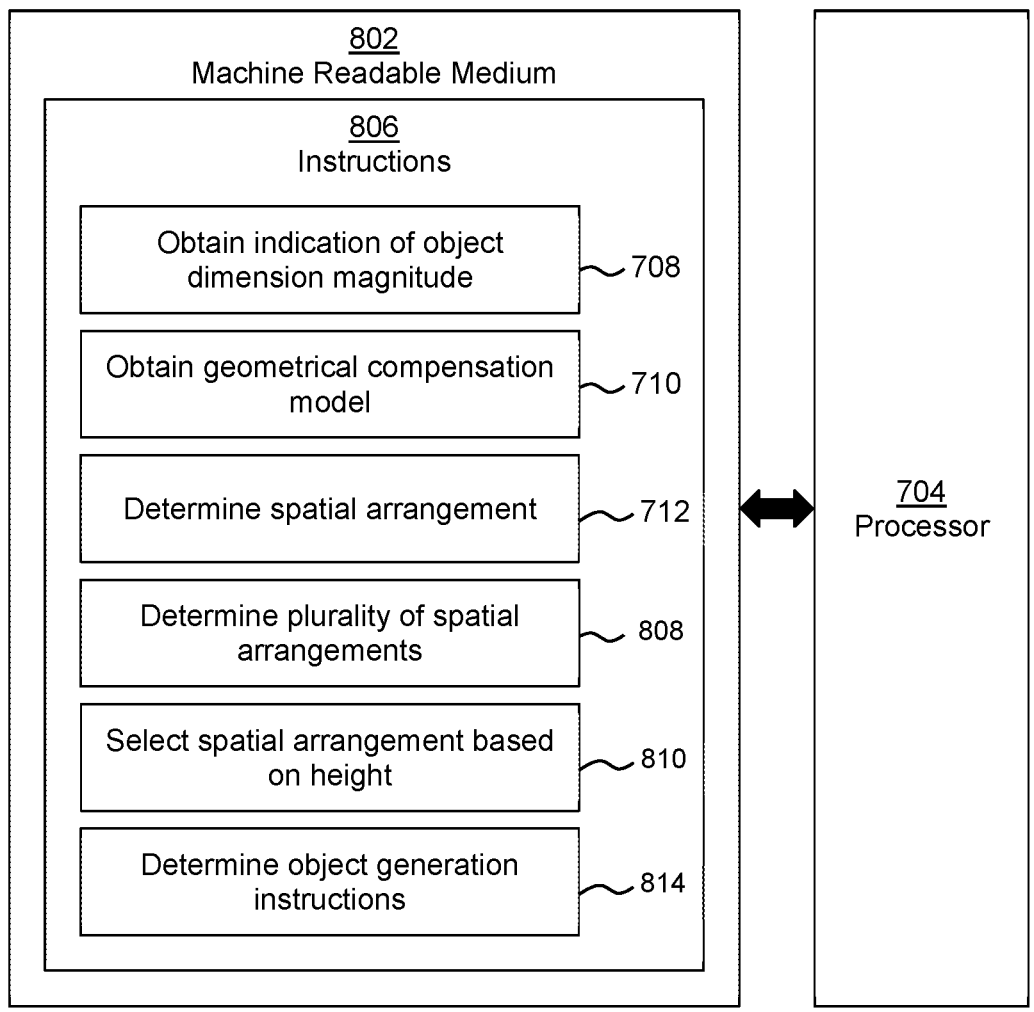

FIG. 8 shows a machine readable medium 802 associated with a processor 704. The machine readable medium 802 comprises instructions which, when executed by the processor 704, cause the processor 704 to carry out instructions 806. The instructions 806 comprise instructions 708, 710, 712 as described in relation to FIG. 7.

The instructions 806 further comprise instructions 808 to determine a plurality of different spatial arrangements of objects to be generated in the additive manufacturing apparatus having a negative correlation between object dimension magnitude and geometrical compensation magnitude. Each of the further spatial arrangements may be determined in a similar manner to the spatial arrangement determined by instruction 712. In some examples each of the further spatial arrangements may be obtained from preceding spatial arrangements, for example using the 'shuffling' method described previously.

The instructions 806 further comprise instructions 810 to select a spatial arrangement of the plurality of spatial arrangements based on a height of the arrangements. The selected spatial arrangement may be selected based on any of the criteria described previously. For example selecting a spatial arrangement may be based on at least one of: avoidance of collisions between objects within the fabrication chamber, a number of objects which fit in a fabrication chamber for a spatial arrangement, a number of objects in the fabrication chamber in each spatial arrangement, heights of the objects and/or a depth of build material used to build objects in each spatial arrangement. In some examples selecting the spatial arrangement may consider hardware constraints, for example a spatial arrangement may not be selected if it results in a particular object or object portion being located in a position within the build volume which is known to produce inaccurate dimensions. For example, a spatial arrangement which allows all of, or as many as possible of, the objects to be generated in a single additive manufacturing process may be selected above a spatial arrangement which does not fit all the objects in a single build volume. In some examples the selection may favour spatial arrangements which reduce use of build material by selecting a spatial arrangement with a low depth of build material.

The instructions 806 further comprise instructions 814 to determine object generation instructions for generating the objects in the determined spatial arrangement. In some examples the object generation instructions are determined for each of the determined spatial arrangements, whereas in other examples the object generation instructions are determined for the selected spatial arrangement. The object generation instructions may be executable by an additive manufacturing apparatus, and when executed by the additive manufacturing apparatus cause it to generate objects in the determined spatial arrangement.

In some examples, the machine-readable medium 702, 802 of FIG. 7 or 8, or another machine-readable medium may be provided with instructions to cause a processor 704 to carry out any of the blocks of FIG. 1 or 4, or any of blocks 302 to 312 of FIG. 3. In some examples, the machine-readable medium 702, 802 of FIG. 7 or 8, or another machine-readable medium may comprise instructions to provide the weighting module 504 and/or the arrangement module 506.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules (e.g. the weighting module 504 and/or the arrangement module 506) of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
obtaining, by a processor, a compensation model characterizing a relationship between an object location within a fabrication chamber of an additive manufacturing apparatus and a geometrical compensation to be applied to an object model, wherein different geometrical compensation values are associated with different locations within the fabrication chamber;
determining, by the processor, magnitudes of dimension parameters and geometrical compensation values of a plurality of objects to be generated within the fabrication chamber in a build operation, the geometrical compensation values determined using the compensation model;
determining, by the processor, a spatial arrangement of the objects to be generated within the fabrication chamber, based on the magnitudes of the dimension parameters and the geometrical compensation values of the objects, such that the objects for which the magnitudes of the dimension parameters are larger are preferentially located at locations within the fabrication chamber for which the geometrical compensation values are lower; and
causing the additive manufacturing apparatus to generate the objects within the fabrication chamber in the determined spatial arrangement.

2. The method as claimed in claim 1, wherein the geometrical compensation comprises a scaling operation and/or a surface offset operation.

3. The method as claimed in claim 2, wherein the scaling operation is to modify a geometry of the object model in a direction perpendicular to layers of build material deposited during the build operation.

4. The method as claimed in claim 1, wherein the dimension parameter of each object is a maximum dimension in a direction perpendicular to layers of build material deposited during the build operation.

5. The method as claimed in claim 1, wherein determining the spatial arrangement comprises:
determining a plurality of candidate spatial arrangements of the objects to be generated within the fabrication chamber, each candidate spatial arrangement based on the magnitudes of the dimension parameters and the geometrical compensation values of the objects.

6. The method as claimed in claim 5, wherein determining the plurality of candidate spatial arrangements comprises:
applying at least one of a randomized object rotation and a randomized object translation to a first candidate spatial arrangement to determine a second candidate spatial arrangement.

7. The method as claimed in claim 5, wherein determining the plurality of candidate spatial arrangements further comprises, for each spatial arrangement:
determining, by a processor, a height of build material that would be used in generating the objects to be generated in the candidate spatial arrangement.

8. The method as claimed in claim 7, wherein determining the spatial arrangement further comprises:
selecting, from among the plurality of candidate spatial arrangements, the candidate spatial arrangement for use in generating the objects based on the determined heights of the candidate spatial arrangements.

9. A system comprising:
a processor; and
a memory storing instructions executable by the processor to:
determine weightings of a plurality of objects to be generated by an additive manufacturing apparatus, based on dimensions of the objects;
obtain a geometrical compensation profile for a build chamber of the additive manufacturing apparatus in which the objects are to be generated, the geometrical compensation profile specifying different geometrical compensations for different intended object generation locations within the build chamber, and
determine an arrangement of the objects within the build chamber by preferentially locating the objects for which the weightings correspond to larger dimensions at positions with smaller geometrical compensations, according to the geometrical compensation profile.

10. The system as claimed in claim 9, further comprising: the additive manufacturing apparatus to generate the objects within the build chamber according to the determined arrangement.

11. A non-transitory machine readable medium storing instructions executable by a processor to perform processing comprising:
   obtaining an indication of an object dimension magnitudes of each of a plurality of objects to be manufactured in a build chamber of an additive manufacturing apparatus;
   obtaining a geometrical compensation model of the build chamber of the additive manufacturing apparatus, the geometrical compensation model specifying geometrical compensations to compensate for anticipated deformation during object generation, where the geometrical compensations specified by the geometrical compensation model are of different magnitudes for different locations within the build chamber;
   determining a spatial arrangement of the objects to be manufactured in the additive manufacturing apparatus to provide a negative correlation between the object dimension magnitude and geometrical compensation magnitude as specified by the geometrical compensation model; and
   causing the additive manufacturing apparatus to manufacture the objects within the build chamber in the determined spatial arrangement.

12. The machine readable medium as claimed in claim 11, wherein the processing further comprises:
   determining object generation instructions for generating manufacturing the objects in the determined spatial arrangement.

13. The machine readable medium as claimed in claim 11, wherein determining the spatial arrangement of the objects comprises:
   determining a plurality of different candidate spatial arrangements of the objects to be manufactured in the additive manufacturing apparatus that have the having a negative correlation between the object dimension magnitude and the geometrical compensation magnitude; and
   selecting a candidate spatial arrangement from among the plurality of different candidate spatial arrangements based on heights of the different candidate spatial arrangements.

* * * * *